(12) United States Patent
Wang et al.

(10) Patent No.: US 7,821,195 B2
(45) Date of Patent: Oct. 26, 2010

(54) HIGH COLOR EXPRESSION DISPLAY DEVICE

(75) Inventors: Chun-Chieh Wang, Hsin-Chu (TW); Chung-Ting Chen, Hsin-Chu (TW); Chen-Hsien Liao, Hsin-Chu (TW); Chien-Chih Chen, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

(21) Appl. No.: 12/691,298

(22) Filed: Jan. 21, 2010

(65) Prior Publication Data

US 2010/0188612 A1   Jul. 29, 2010

(30) Foreign Application Priority Data

Jan. 23, 2009  (TW) ............................... 98102981 A

(51) Int. Cl.
*H05B 51/00* (2006.01)
(52) U.S. Cl. ...................................................... 313/501
(58) Field of Classification Search ................ 313/501, 313/512; 349/69–70
See application file for complete search history.

(56) References Cited

U.S. PATENT DOCUMENTS

| 2004/0218115 | A1* | 11/2004 | Kawana et al. ................. 349/71 |
| 2007/0205712 | A1* | 9/2007 | Radkov et al. ............... 313/503 |
| 2009/0135337 | A1 | 5/2009 | Wang et al. |
| 2009/0135338 | A1 | 5/2009 | Wang et al. |

\* cited by examiner

*Primary Examiner*—Joseph L Williams
*Assistant Examiner*—Hana S Featherly
(74) *Attorney, Agent, or Firm*—Muncy, Geissler, Olds & Lowe, PLLC

(57) ABSTRACT

A high color expression display device and a method for manufacturing the same are provided. The display device includes a backlight module and a display panel for receiving light from the backlight module. The display panel has a color filter layer which consists of a plurality of color resists above the backlight module. Lights from the backlight module pass through the color resists and out of the display panel to form an output light. A NTSC saturation of the output light may be greater or smaller than 60%, and a CIE standard illuminant C test result of the color resists may correspondingly fall into different predetermined scopes to prevent color shift and maintain brightness of the display device.

11 Claims, 5 Drawing Sheets

HIGH COLOR EXPRESSION DISPLAY DEVICE

This application claims the priority based on a Taiwanese Patent Application No. 098102981, filed on Jan. 23, 2009, the disclosure of which is incorporated herein by reference in its entirety.

BACKGROUND OF THE INVENTION

1. Field of the Invention

The present invention relates to a display device and a method for manufacturing the same; more particularly, the present invention relates to a high color expression display device and a method for manufacturing the same.

2. Description of the Prior Art

Display panels and panel display devices using the display panels have become the mainstream display devices. For example, various panel displays, home flat televisions, panel monitors of personal computers and laptop computers, and display screens of mobile phones and cameras are products widely using display panels. Particularly, the market demand for liquid crystal display devices largely increases in recent years. In order to meet the function and appearance requirements of liquid crystal displays, the design of backlight modules used in liquid crystal display devices is also diverse.

In conventional, the backlight module usually uses tube lamps as the backlight source. Light emitted from the tube lamp can achieve a certain level of color rendering and color saturation. However, since the tube lamp occupies a larger space, the backlight module equipped with the tube lamp accordingly has a larger volume. Additionally, the tube lamp consumes more power resulting in low usable time for the entire system. In order to address the above problems, some backlight modules use white light emitting diodes (LEDs) as the light source. The white LED is advantageous in environmental protection, low power consumption, and small volume. However, the color expression and color saturation of the white LED still cannot match up those of the tube lamp. For example, the white LED made of a blue LED chip with yellow green phosphors usually generates small energy in the red light range causing color shift in the generated white light.

Additionally, due to material properties and production limitations of the white LED, the availability of white LEDs is restricted. As shown in FIG. 1, due to various limitations, the available or suitable white LEDs are those having coordinates fallen into the area 10 (for example, in the CIE 1931 coordinate system). However, in consideration of color saturation and expression of other colors, the practical white LEDs may be those having coordinates fallen into the area 30. Since only half of white LEDs in the area 30 will meet the limitations defined in the area 10, the other half of white LEDs are not applicable which inevitably increases the production cost.

Furthermore, for the current white LED technology, when the NTSC saturation of the display module is greater than 60%, other than the difficulties in selecting or manufacturing white LEDs, the overall green color of the display module usually shifts to adversely affect the overall color expression. The "NTSC saturation" means a percentage expression of dividing the actual color area of primary colors of the display module by the standard color area of primary colors defined by the NTSC (National Television System Committee). As described above, the color shift problem occurred when the NTSC saturation is high is one of the major problems of using the white LED as the backlight source.

SUMMARY OF THE INVENTION

An objective of the present invention is to provide a display device and a method for manufacturing the same to achieve a better color expression and maintain the overall brightness.

Another objective of the present invention is to a provide display device and a method for manufacturing the same, which may use white light emitting diodes (LEDs) with different color expression as a backlight source.

Another objective of the present invention is to provide a display device and a method for manufacturing the same to reduce the production cost.

In one embodiment, the display device includes a backlight module and a display panel disposed on the backlight module for receiving lights from the backlight module so as to produce images on the display panel. The display panel includes a color filter layer which consists of a plurality of color resists above the backlight module. Lights from the backlight module pass through the color resists and out of the display panel to form an output light. When a NTSC saturation of the output light is less than 60%, a result of the color resists under a CIE standard illuminant C test may include:

$$0.125 < By < 0.172;$$

$$2.4(Bx-0.151)+0.142 \leq By \leq 2.5(Bx-0.139)+0.142;\text{ and}$$

$$0.36 < RY/GY < 0.40,$$

wherein (Bx, By) are coordinates of blue light obtained from the CIE standard illuminant C test, RY and GY are transmittances of red light and green light, respectively.

When the NTSC saturation of the output light is greater than 60%, the result of the color resists under the CIE standard illuminant C test may include:

$$0.123 < By < 0.154;$$

$$Gx < 0.275;$$

$$0.594 < Gy < 0.620;\text{ and}$$

$$RY/BY > 1.06,$$

wherein (Gx, Gy) are coordinates of green light obtained from the CIE standard illuminant C test, BY is a transmittance of blue light.

With such an arrangement of the color resists, coordinates (Wx, Wy) of the output light can be maintained approximate to coordinates (0.313, 0.329) of the standard white light so that the entire module can achieve a better performance when outputting the white light and can also maintain the transmittance of light without affecting brightness.

DETAILED DESCRIPTION OF THE PREFERRED EMBODIMENT

The present invention provides a display device and a method for manufacturing the same. In a preferred embodiment, the display device includes a liquid crystal display device, such as liquid crystal display televisions, liquid crystal display monitors of personal computers and laptop computers, and liquid crystal display screens of mobile phones and digital cameras.

Figure 1:
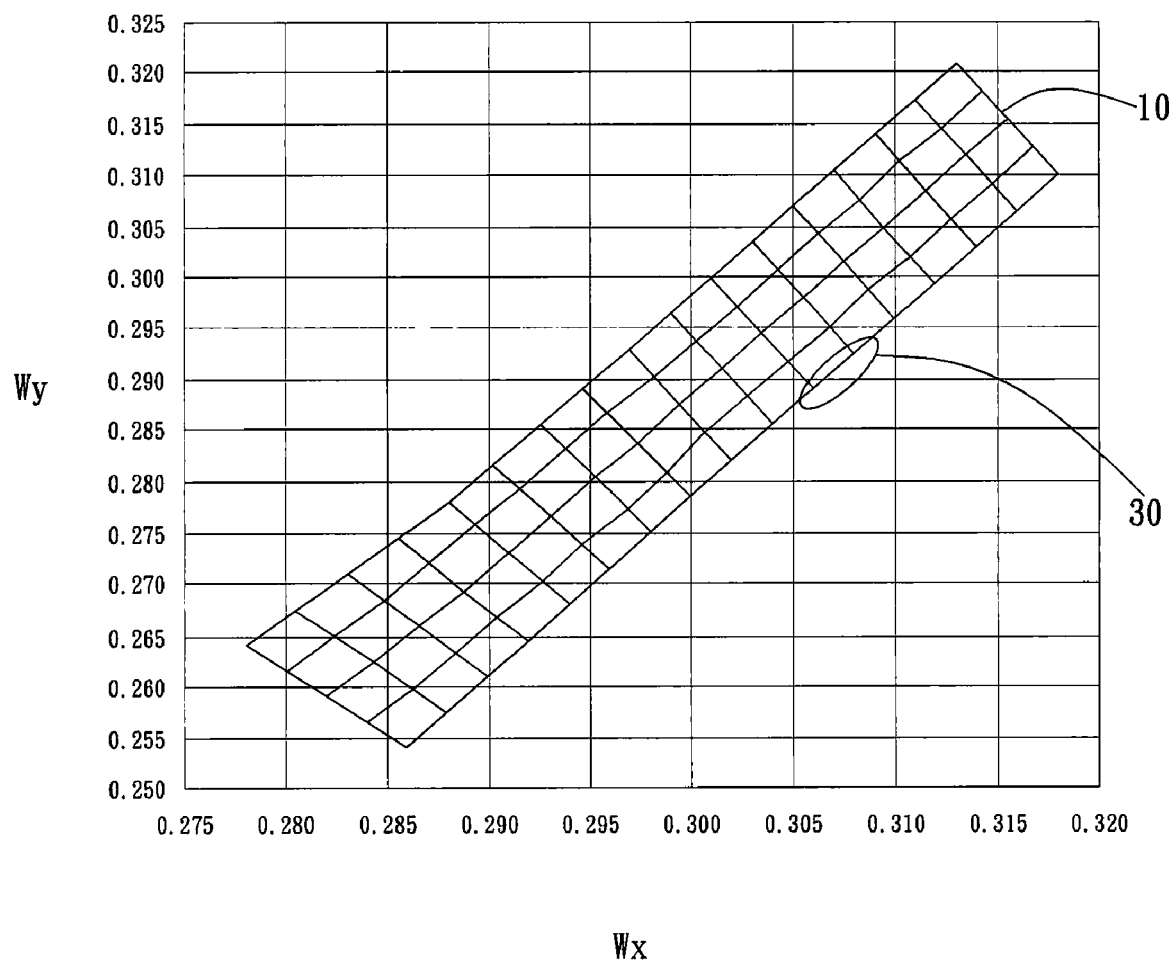
FIG. 1 illustrates a schematic chromaticity diagram of a conventional white LED.
Figure 2:
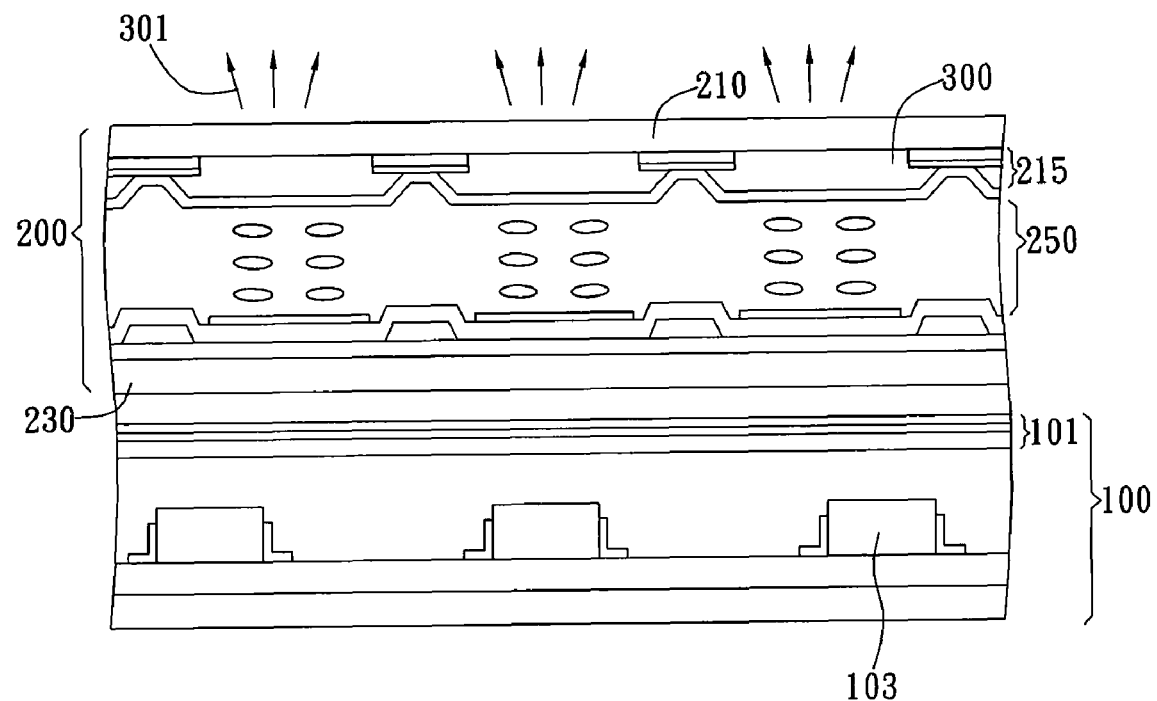
FIG. 2 illustrates a schematic cross-sectional view of a display device of the present invention.

As shown in FIG. 2, the display device preferably includes a backlight module 100 and a display panel 200. In this embodiment, the backlight module 100 can be a direct type backlight module; however, in a different embodiment, the backlight module 100 can include a light guide plate to form an edge type backlight module. The display panel 200 is disposed on the backlight module 100 and configured to receive lights from the backlight module 100. The display panel 200 preferably includes a first substrate 210, a second substrate 230, and a liquid crystal layer 250. The liquid crystal layer 250 is sandwiched between the first substrate 210 and the second substrate 230, and the behavior of liquid crystal molecules thereof is controlled by the electrodes on the first substrate 210 and the second substrate 230. By controlling the behavior of the liquid crystal molecules, the display panel 200 is capable of exhibiting different brightness at different pixels so that images to be viewed by users are formed.

When the first substrate 210 is a color filter substrate, a color filter layer 215 including a plurality of color resists 300 is disposed on the inner surface of the first substrate 210. However, in a different embodiment, the color filter layer 215 can be disposed on the second substrate 230 or other locations above the backlight source 103 of the backlight module 100. In this embodiment, after light of the backlight module 100 passes though the liquid crystal layer 250, the light then passes through the color resists 300 of the first substrate 210. Different color resist is selective to light of different wavelength. That is, different color resist allows light having a wavelength within in a given range to pass therethrough and blocks light having other wavelengths so that the display panel 200 is enabled to display different images. In this embodiment, the color resists 300 of the color filter layer 215 preferably include red, green, and blue resists, and the thickness thereof is preferably between 1.4 μm and 2.5 μm to accommodate the requirements of manufacturing processes and other elements. Moreover, the color filter layer may include resists of other color, such yellow, magenta, etc.

For the output light 301 emitted from the color resists 300, the color expression thereof is determined by two parameters: the spectrum characteristics of the light generated by the backlight module 100 and the optical property of the color resists 300. Since the spectrum characteristics of the light generated by the backlight module is constant and not easy to be changed under certain conditions, it is preferably to modify the optical property of the color resists 300 for a better color expression. However, in other embodiments, the employment of backlight module 100 having different spectrum characteristics in cooperation with the color resists having modified optical property can also achieve a better effect.

The optical property of the color resists 300 is preferably represented in accordance with the standard illuminant C test defined by the International Commission on Illumination (CIE). Standard illuminant C is a CIE standard illuminant for filtered tungsten illumination that simulates average daylight with a correlated color temperature (CCT) of 6774 degrees K. Besides directly performing the CIE standard illuminant C test, a standard illuminant A test can be performed to measure the transmittance of the color resists 300, and the spectrum of the CIE standard illuminant C can be then used to calculate the transmittance spectrum occurred when the illuminant C serves as the test light source. Thereafter, the chromatic value of the color resist 300 can be obtained. The standard illuminant A is a tungsten lamp with a color temperature 2856 degrees K.

In a preferred embodiment, when a NTSC saturation of the output light 301 is less than 60%, the result of the color resist 300 under the CIE standard illuminant C test includes:

$0.125 < By < 0.172$;

$2.4(Bx-0.151)+0.142 \leq By \leq 2.5(Bx-0.139)+0.142$; and $0.36 < RY/GY < 0.40$, wherein (Bx, By) are coordinates of blue light obtained from the CIE standard illuminant C test, RY and GY are transmittances of red light and green light, respectively. With such an arrangement of the color resists 300, the coordinates (Wx, Wy) of the output light can be maintained approximate to coordinates (0.313, 0.329) of the standard white light with a tolerance preferably between ±(0.010, 0.010). Therefore, the entire module can achieve a better performance when outputting the white light. Moreover, the overall color of the output light does not shift easily and the light transmittance is also maintained without affecting the brightness.

Table 1 shows the test result on color characteristics of the color resists 300 when the NTSC saturation of the output light is less than 60%.

TABLE 1

| Test result on color characteristics | | | | | | | |
|---|---|---|---|---|---|---|---|
| Rx | Ry | Gx | Gy | Bx | By | Wx | Wy |
| 0.595 | 0.345 | 0.322 | 0.556 | 0.156 | 0.143 | 0.310 | 0.331 |

Figure 3:
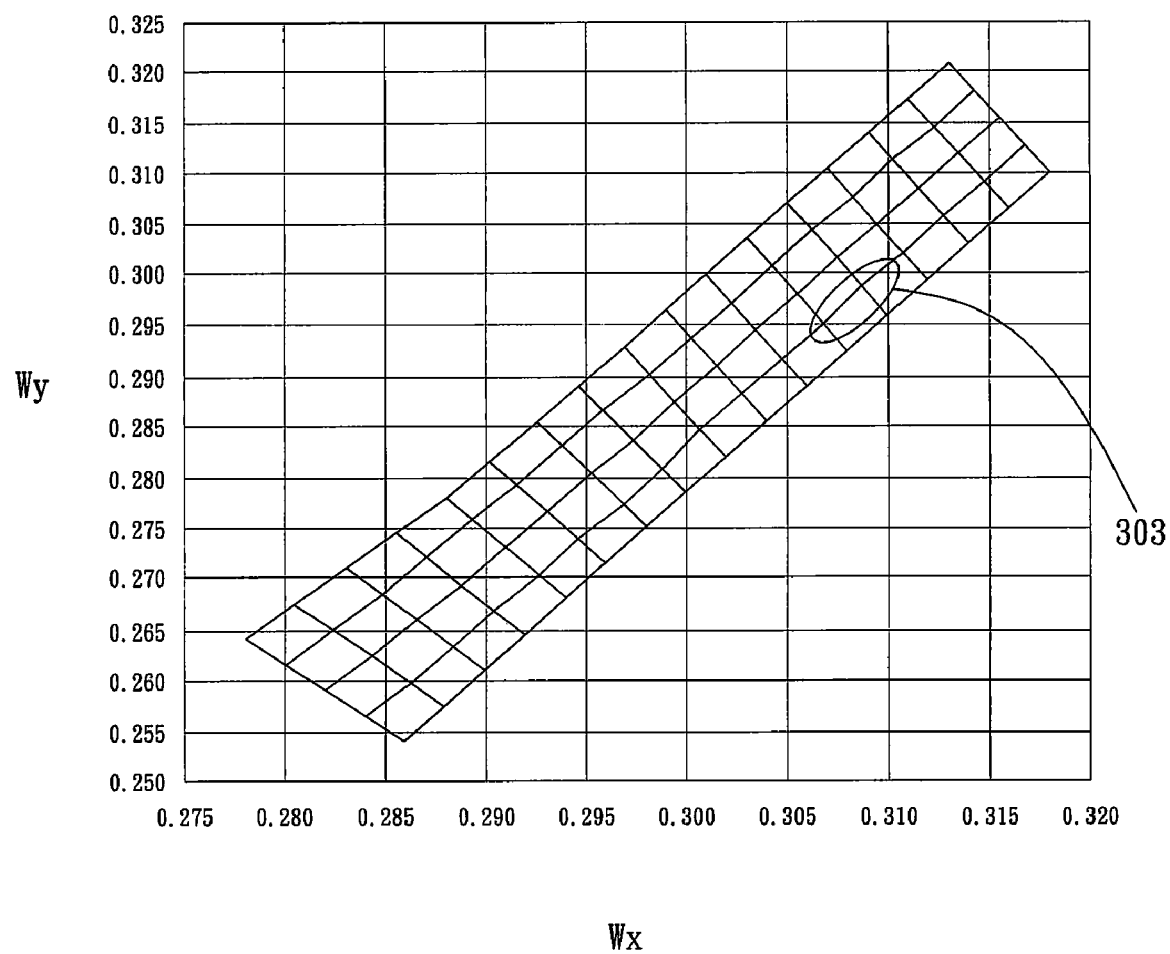
FIG. 3 is a schematic chromaticity diagram of a white LED in accordance with an embodiment of the present invention.

In this embodiment, the backlight source 103 in cooperation with the color resists 300 has the color output characteristics shown in FIG. 3. From Table 1, with the color resists 300, the output result of (Wx, Wy) is relatively close to the position (0.313, 0.329) of the standard white light. The output results of (Rx, Ry), (Gx, Gy), and (Bx, By) respectively for red, green, and blue colors are also within a reasonable range without color shift.

Additionally, in a preferred embodiment, when the NTSC saturation of the output light 301 is less than 60%, the color resists 300 can be further controlled to obtain Gx>0.282 under the CIE standard illuminant C test. With such a modification, the color resists 300 can have more options to incorporate with the backlight source 103. That is, the color resists 300 can match more backlight sources 103 with a variety of color output characteristics. In a different embodiment, if the color resists 300 are controlled to obtain Ry>0.316 under the CIE standard illuminant C test, a similar effect can be achieved. Ry is y coordinate of red light obtained from the CIE standard illuminant C test.

In another embodiment, the color resists 300 can be further controlled to obtain, for example, 0.534<Gy<0.564 under the CIE standard illuminant C test, so that the color saturation or purity of the output light can be enhanced. With such a modification, the green color expression of the output light can be modified to improve the overall color saturation. Additionally, when the color resists 300 are controlled to obtain 0.575<Rx<0.605 under the CIE standard illuminant C test, a similar effect can be achieved. Rx is x coordinate of red light obtained from the CIE standard illuminant C test.

The conditions when the NTSC saturation of the output light 301 is greater than 60% are discussed in the following descriptions. When the NTSC saturation of the output light 301 is greater than 60%, the result of the color resists under the CIE standard illuminant C test includes:

0.123<By<0.154;

Gx<0.275;

0.594<Gy<0.620; and

RY/BY>1.06, wherein (Gx, Gy) are coordinates of green light obtained from the CIE standard illuminant C test, BY is a transmittance of blue light. With such an arrangement of the color resists 300, the coordinates (Wx, Wy) of the output light can be maintained approximate to coordinates (0.313, 0.329) of the standard white light with a tolerance preferably between ±(0.010, 0.010). Therefore, the entire module can achieve a better performance when outputting the white light. Moreover, the overall color of the output light does not shift easily, for example, Gx is controlled to be less than 0.330 (i.e. Gx<0.330).

Table 2 shows the test result on color characteristics of the color resists 300 when the NTSC saturation of the output light is greater than 60%.

TABLE 2

Measurements of color characteristics of output light

| Output light of display panel | | | | | | | | | CIE standard illuminant C test result of color resists | | | |
|---|---|---|---|---|---|---|---|---|---|---|---|---|
| Rx | Ry | Gx | Gy | Bx | By | Wx | Wy | NTSC | RY/RB | By | Gx | Gy |
| 0.606 | 0.352 | 0.320 | 0.623 | 0.155 | 0.106 | 0.309 | 0.331 | 60.8% | 1.25 | 0.140 | 0.264 | 0.598 |
| 0.606 | 0.352 | 0.320 | 0.623 | 0.150 | 0.106 | 0.305 | 0.329 | 61.3% | 1.17 | 0.144 | 0.264 | 0.598 |
| 0.606 | 0.352 | 0.327 | 0.618 | 0.150 | 0.106 | 0.307 | 0.332 | 60.1% | 1.17 | 0.144 | 0.273 | 0.595 |
| 0.606 | 0.352 | 0.327 | 0.618 | 0.154 | 0.102 | 0.312 | 0.334 | 60.1% | 1.30 | 0.135 | 0.273 | 0.595 |

In the test of Table 2, the backlight source 103 in cooperation with the color resists 300 has a color output defined in a color space to be 0.285<Wx<0.315, 0.260<Wy<0.310. However, the color output defined in the color space can have a different range. From Table 2, with the color resists 300, the output result of (Wx, Wy) is relatively close to the position (0.313, 0.329) of the standard white light, wherein the tolerance is ±(0.010, 0.010) for each coordinate. The output results of (Rx, Ry), (Gx, Gy), and (Bx, By) respectively for red, green, and blue colors are also within a reasonable range without color shift. Particularly, the Gx is controlled to be less than 0.330 (i.e. Gx<0.330).

Figure 4:
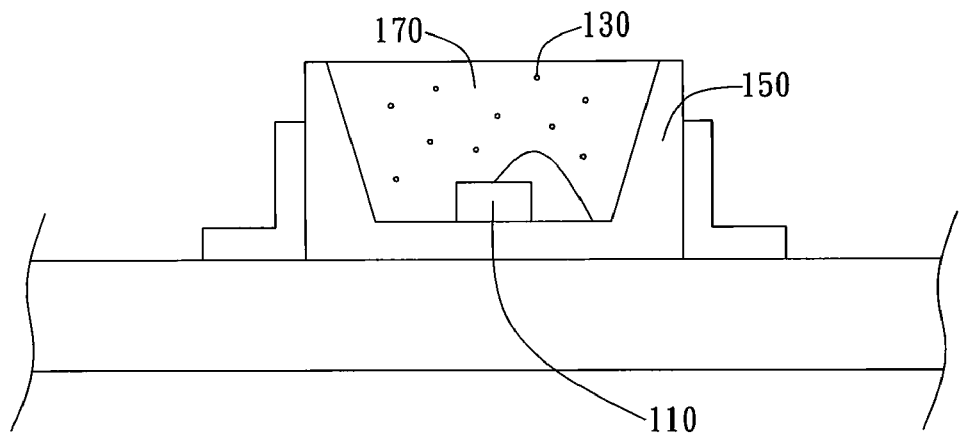
FIG. 4 is a backlight source in accordance with an embodiment of the present invention.

The backlight source 103 of the backlight module 100 preferably includes a light emitting diode (LED). In the embodiment of FIG. 2, the backlight module 100 further includes at least one optical film 101, such as diffusion plate, diffusion sheet, brightness enhancement film, polarizing film, disposed above the backlight source 103. The backlight module 100 can also include other optical elements such as reflective sheet to be disposed corresponding to the backlight source 103 so as to improve the brightness and uniformity of the backlight module 100. As shown in FIG. 4, the white LED includes an active light source 110 and a passive light source 130. The active light source 110 can emit light upon providing a signal, while the passive light source 130 is excited by the light of the active light source 110 to generate light in another color. In this embodiment, the active light source 110 is preferably a blue LED chip, and the passive light source 130 is a non-blue phosphor, particularly a phosphor with a wavelength greater than that of the blue LED chip. When the blue LED chip emits blue light incident onto the phosphor, the phosphor is excited to generate light in different color so as to form a white light. In a preferred embodiment, the blue LED chip is used with yellow green phosphor, such as yttrium aluminum garnet (YAG) phosphor or silicate phosphor. However, in a different embodiment, it can be used with other phosphors such as red and green phosphors. In this embodiment, the phosphors are doped within the transparent body 170 of the bowel 150 of the white LED. In a different embodiment, the phosphors can be disposed (e.g. coated or adhered) at least on a partial light exit surface of the blue LED chip.

Figure 5:
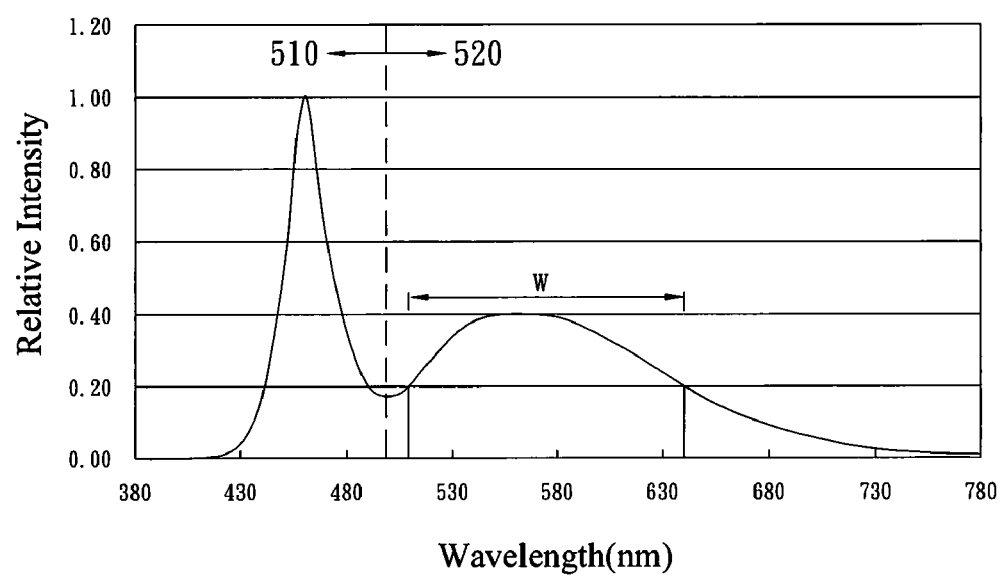
FIG. 5 is a schematic intensity spectrum of a backlight source in accordance with an embodiment of the present invention.

FIG. 5 schematically illustrates an intensity spectrum of the light source 103. As shown in FIG. 5, when the light source 103 is made of blue LED chip with yellow green phosphors, the intensity spectrum preferably exhibits a first peak range 510 and a second peak range 520, and each peak range has a peak value, which represents a local maximum. For clarity, the longitudinal axis in FIG. 5 represents a relative light intensity. As shown in FIG. 5, the first peak range 510 is located on the left side near the blue light range, preferably on the area with wavelength less than 500 nm. The second peak range 520 is located on the right side near the range of green and red lights, preferably on the area with wavelength greater than 500 nm. As shown in FIG. 5, since this embodiment uses the blue LED chip as the active light source 110 to generate blue light, which is then used to excite the passive light source 130 formed by phosphors to generate red and green lights, the intensity value in the first peak range 510 is preferably greater than that in the second peak range 520.

As shown in FIG. 5, since the phosphor in the embodiment is yellow green phosphors, the intensity spectrum exhibits only two peak ranges. Additionally, the intensity in the red light range with wavelength greater than 580 nm is relatively smaller. In other words, in comparison with other colors of light, the red light has smaller energy. In cooperation with the color resists of the above embodiment, the difference in energy among different colors can be balanced and therefore, the chromatic difference can be reduced.

In a preferred embodiment, when the NTSC saturation is greater than 60%, the color resists 300 can be further controlled to obtain Ry<0.330 and Bx>0.136 under the CIE standard illuminant C test, wherein Ry is the y coordinate of red light obtained from the CIE standard illuminant C test. With such a modification, it is possible to control the white light to fall on an appropriate position in the color coordinate system and to reduce the color shift of green light so as to provide an appropriate color expression.

In another embodiment, the color resists 300 can be further controlled to improve the overall color expression of the entire module. As shown in FIG. 5, the second peak range 520 in the intensity spectrum of the backlight source 103 has a full width at half maximum (FWHM) W. The full width at half maximum is a distance between two extreme values of the wavelength at which the intensity is equal to half of its local maximum value within the second peak range 520. In a preferred embodiment, when the full width at half maximum of the second peak range 520 is greater than 110 nm, the color resists 300 can be controlled to allow the result of the CIE standard illuminant C test to further include:

Ry>0.343;

Gx<0.317; and

Bx>0.145, wherein Ry is the y coordinate of red light obtained from the CIE standard illuminant C test.

In this embodiment, the active light source 110 of the backlight source 103 is preferably a blue LED chip, and the passive light source 130 is a YAG phosphor.

In another embodiment, when the full width at half maximum W of the second peak range 520 is less than 110 nm, the color resists 300 can be controlled to allow the result of the CIE standard illuminant C test to further include:

Ry>0.348;

Gx<0.330; and

Bx>0.148, wherein Ry is the y coordinate of red light obtained from the CIE standard illuminant C test.

In this embodiment, the active light source 110 of the backlight source 103 is preferably a blue LED chip, and the passive light source 130 is a silicate phosphor.

Figure 6:
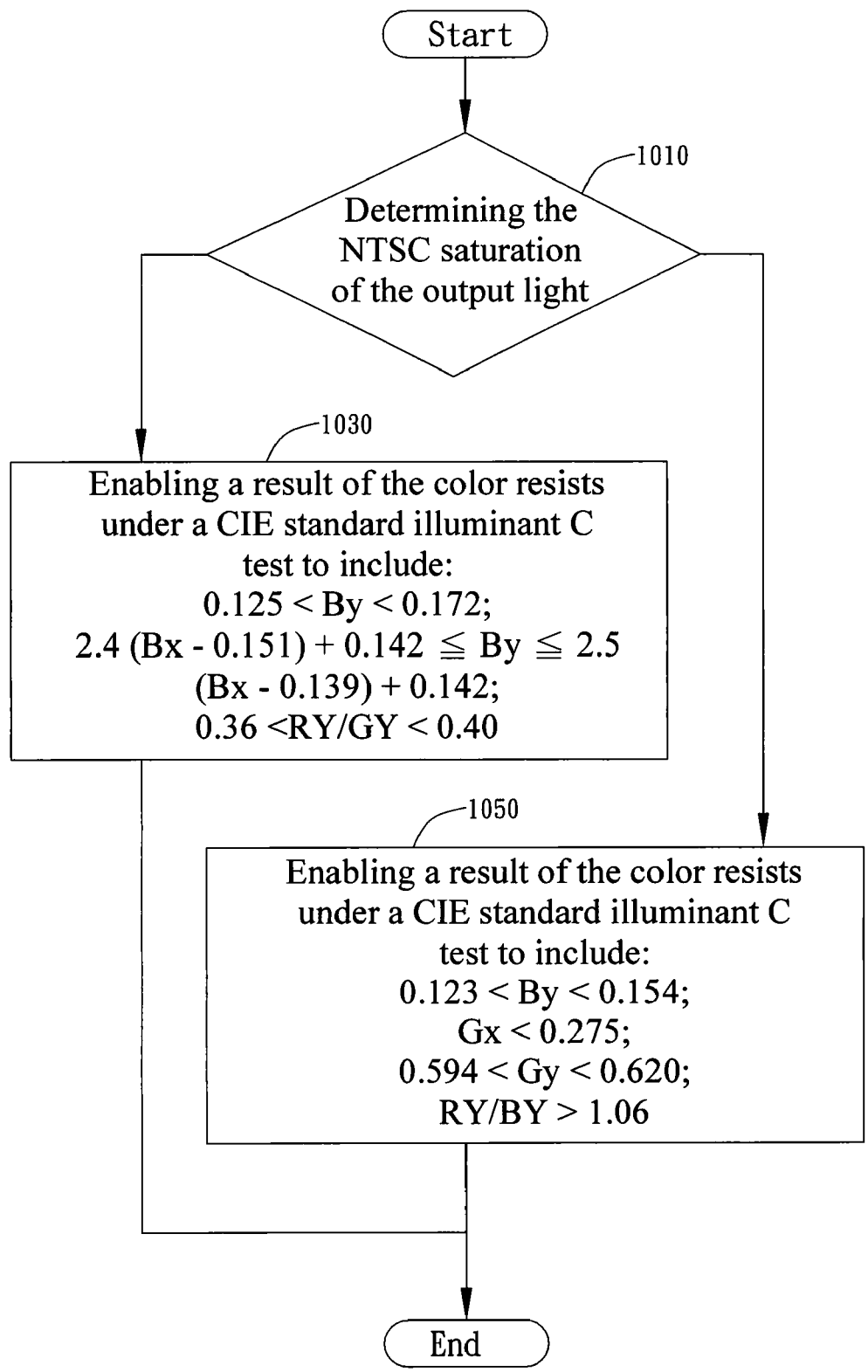
FIG. 6 is a flow diagram of a manufacture method of a display device in accordance with an embodiment of the present invention.

The present invention also provides a method for manufacturing the display device. As the flow diagram shown in FIG. 6, step 1010 includes determining the NTSC saturation of the output light of the display device. The determination can be performed by experiments, simulations, or calculations to project the NTSC saturation of the output light occurred when the display device is assembled. When the NTSC saturation is determined to be less than 60%, step 1030 includes enabling a result of the color resists under a CIE standard illuminant C test to include:

0.125<By<0.172;

2.4(Bx−0.151)+0.142≦By≦2.5(Bx−0.139)+0.142; and 0.36<RY/GY<0.40, wherein (Bx, By) are coordinates of blue light obtained from the CIE standard illuminant C test, RY and GY are transmittances of red light and green light, respectively. With such an arrangement of the color resists 300, the coordinates (Wx, Wy) of the output light can be maintained approximate to coordinates (0.313, 0.329) of the standard white light with a tolerance preferably between ±(0.010, 0.010). Therefore, the entire module can achieve a better performance when outputting the white light. Moreover, the overall color of the output light does not shift easily and the light transmittance is also maintained without affecting the brightness. In a preferred embodiment, by modifying the component ratio of the color resists, changing the manufacturing process of the color resists, changing the structural size of the color resists, or other parameters, the CIE standard illuminant C test of the color resists can be fallen within the above described conditions.

When the NTSC saturation is determined to be greater than 60%, step 1050 includes enabling a result of the color resists under a CIE standard illuminant C test to include:

0.123<By<0.154;

Gx<0.275;

0.594<Gy<0.620; and

RY/BY>1.06, wherein (Gx, Gy) are coordinates of green light obtained from the CIE standard illuminant C test, BY is a transmittance of blue light. With such an arrangement of the color resists 300, the coordinates (Wx, Wy) of the output light can be maintained approximate to coordinates (0.313, 0.329) of the standard white light with a tolerance preferably between ±(0.010, 0.010). Therefore, the entire module can achieve a better performance when outputting the white light. As described above, by modifying the component ratio of the color resists, changing the manufacturing process of the color resists, changing the structural size of the color resists, or other parameters, the CIE standard illuminant C test of the color resists can be fallen within the above described conditions.

The present invention has been described through the relevant embodiments above; however, the embodiments above are only exemplary. What needs to point out is that the embodiments disclosed are not intended to limit the scope of the present invention. Contrarily, the modifications and the equivalents included in the spirit and scope of the claims are all included in the scope of this invention.

What is claimed is:

1. A display device, comprising:
a backlight source with an intensity spectrum exhibiting a first peak range and a second peak range; and
a plurality of color resists formed on the backlight source and configured to filter lights emitted form the backlight source to generate an output light, wherein a result of the color resists under a CIE standard illuminant C test is selected from one of combinations (a) and (b):
(a) when a NTSC saturation of the output light is less than 60%, 0.125<By<0.172;

2.4(Bx−0.151)+0.142≦By≦2.5(Bx−0.139)+0.142; and 0.36<RY/GY<0.40, wherein (Bx, By) are coordinates of blue light obtained from the CIE standard illuminant C test, RY and GY are transmittances of red light and green light, respectively;
(b) when the NTSC saturation of the output light is greater than 60%, 0.123<By<0.154;

Gx<0.275;

$0.594 < Gy < 0.620$; and $RY/BY > 1.06$, wherein (Gx, Gy) are coordinates of green light obtained from the CIE standard illuminant C test, BY is a transmittance of blue light.

2. The display device of claim 1, wherein a wavelength distributed in the second peak range is greater than that in the first peak range, and a peak value of the first peak range is greater than that of the second peak range.

3. The display device of claim 1, wherein the combination (b) further includes: Ry<0.330 and Bx>0.136, wherein Ry is a y coordinate of red light obtained from the CIE standard illuminant C test.

4. The display device of claim 1, wherein the combination (a) further includes: Gx>0.282.

5. The display device of claim 1, wherein the combination (a) further includes: Ry>0.316, wherein Ry is a y coordinate of red light obtained from the CIE standard illuminant C test.

6. The display device of claim 1, wherein the combination (a) further includes: 0.534<Gy<0.564.

7. The display device of claim 1, wherein the combination (a) further includes: 0.575<Rx<0.605, wherein Rx is an x coordinate of red light obtained from the CIE standard illuminant C test.

8. A display device, comprising:
a backlight source with an intensity spectrum exhibiting a first peak range and a second peak range; and
a plurality of color resists formed on the backlight source and configured to filter lights emitted form the backlight source to generate an output light, wherein a result of the color resists under a CIE standard illuminant C test is selected from one of combinations (a) and (b):
(a) when a NTSC saturation of the output light is less than 60%, $0.125 < By < 0.172$;

$2.4(Bx-0.151)+0.142 \leq By \leq 2.5(Bx-0.139)+0.142$; and $0.36 < RY/GY < 0.40$, wherein (Bx, By) are coordinates of blue light obtained from the CIE standard illuminant C test, RY and GY are transmittances of red light and green light, respectively;
(b) when the NTSC saturation of the output light is greater than 60%, and when a full width at half maximum of the second peak range in the intensity spectrum is greater than 110 nm, $0.123 < By < 0.154$;

$Gx < 0.317$;

$0.594 < Gy < 0.620$;

$RY/BY > 1.06$;

$Ry > 0.343$; and $Bx > 0.145$, wherein (Gx, Gy) are coordinates of green light obtained from the CIE standard illuminant C test, BY is a transmittance of blue light, and Ry is a y coordinate of red light obtained from the CIE standard illuminant C test; and wherein a wavelength distributed in the second peak range is greater than that in the first peak range, and a peak value of the first peak range is greater than that of the second peak range.

9. The display device of claim 8, wherein the backlight source comprises a blue light emitting diode, the blue light emitting diode has a YAG phosphor.

10. A display device, comprising:
a backlight source with an intensity spectrum exhibiting a first peak range and a second peak range; and
a plurality of color resists formed on the backlight source and configured to filter lights emitted form the backlight source to generate an output light, wherein a result of the color resists under a CIE standard illuminant C test is selected from one of combinations (a) and (b):
(a) when a NTSC saturation of the output light is less than 60%, $0.125 < By < 0.172$;

$2.4(Bx-0.151)+0.142 \leq By \leq 2.5(Bx-0.139)+0.142$; and $0.36 < RY/GY < 0.40$, wherein (Bx, By) are coordinates of blue light obtained from the CIE standard illuminant C test, RY and GY are transmittances of red light and green light, respectively;
(b) when the NTSC saturation of the output light is greater than 60%, and when a full width at half maximum of the second peak range in the intensity spectrum is less than 110 nm, $0.123 < By < 0.154$;

$Gx < 0.330$;

$0.594 < Gy < 0.620$;

$RY/BY > 1.06$;

$Ry > 0.348$; and $Bx > 0.148$, wherein (Gx, Gy) are coordinates of green light obtained from the CIE standard illuminant C test, BY is a transmittance of blue light, and Ry is a y coordinate of red light obtained from the CIE standard illuminant C test; and wherein a wavelength distributed in the second peak range is greater than that in the first peak range, and a peak value of the first peak range is greater than that of the second peak range.

11. The display device of claim 10, wherein the backlight source comprises a blue light emitting diode, the blue light emitting diode has a silicate phosphor.

* * * * *